Aug. 21, 1962     P. S. HUDSON     3,050,423
SOLID PROPELLANT
Filed June 15, 1959
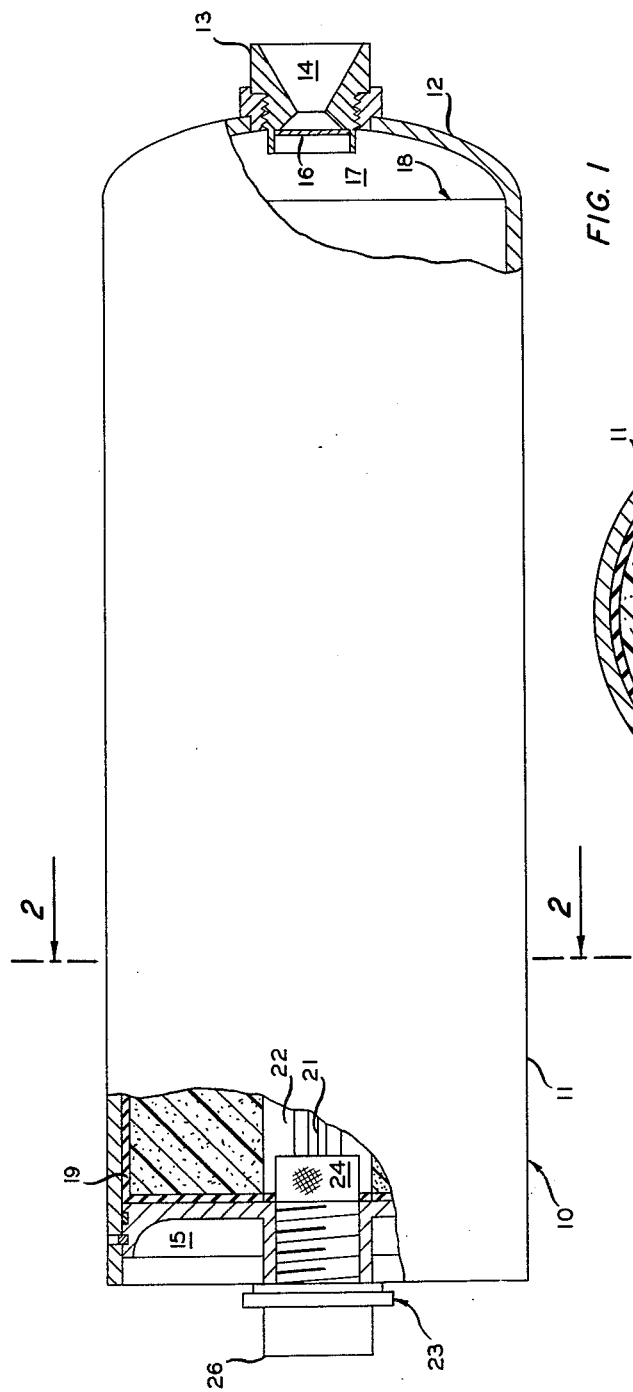
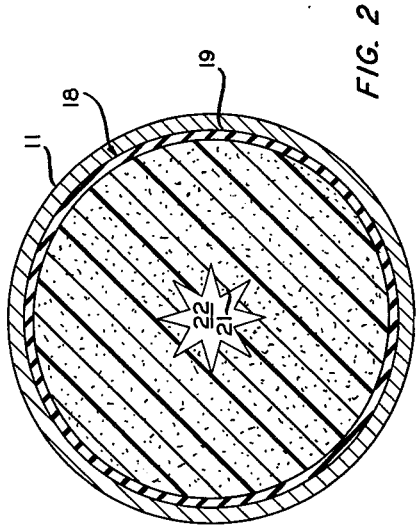
FIG. 1
FIG. 2
INVENTOR.
P. S. HUDSON
BY Hudson E. Young
ATTORNEYS 3,050,423
SOLID PROPELLANT
Paul S. Hudson, Bartlesville, Okla., assignor to Phillips Petroleum Company, a corporation of Delaware
Filed June 15, 1959, Ser. No. 820,556
8 Claims. (Cl. 149—19)

This invention relates to a solid propellant. In another aspect, it relates to a novel, castable solid propellant composition of the composite type having improved physical properties. In another aspect, it relates to a jet propulsion device, such as a missile, gas generator, rocket motor of the type employed to assist the take-off of aircraft, and the like, the combustion chamber of which is loaded with a novel, castable, solid propellant composition.

In the past 15 years or so, great interest developed in solid propellants for jet propulsion devices, such as missiles, rocket motors, gas generators, and the like. One type of solid propellant which has received particular attention is that of the composite type. A typical composite propellant comprises a finely divided inorganic oxidizer material such as ammonium perchlorate, bonded together by an organic resin to form a solid mass. The oxidizer furnishes oxygen required for the combustion of the organic resin, the latter generally referred to as the fuel-binder. These propellants can also contain various other compounding ingredients, such as burning rate catalyst which is used in controlling the velocity at which the propellant is burned or consumed during operation.

One of the most important solid propellant parameters is the burning rate of the propellant. The basic solid propellant burning equation for restricted solid propellants, such as the type with which this invention is concerned, is expressed as:

$$r = k(p_c)^n$$

where $r$ is the burning rate in inches per second; $p_c$ is the combustion chamber pressure in pounds per square inch; $k$ is a constant which varies with the ambient grain temperature; and $n$ is a constant known as the burning rate exponent.

Inspection of the above burning equation reveals that the sensitivity of the burning rate of the solid propellant to pressure is represented by the burning rate exponent $n$. For stable and practical operation, $n$ should lie between 0 and 1, and preferably should be as low as possible since as $n$ approaches 1 the burning rate is very sensitive to changes in combustion chamber pressure, and vice versa. The importance of the burning rate cannot be overestimated since the velocity at which a solid propellant is consumed during operation is determined to a great extent by the burning rate; where high thrusts are required in relatively short periods of time, solid propellants having fast burning rates are utilized. With the availability of solid propellant compositions having controllable burning rates which are relatively fast and insensitive to combustion chamber pressure, the fabricator of solid propellants has greater latitude in choosing the desired propellant grain design or charge geometry.

Another important parameter of a propellant system is specific impulse $I_{sp}$, which is the amount of thrust in pounds that can be obtained per pound of propellant consumed per second. This property has a direct bearing on the overall efficiency of a propellant system. A high value of $I_{sp}$ is desirable and a small increase in specific impulse can result in an appreciable improvement in range.

In addition to burning and specific impulse characteristics, the propellant must have certain physical properties, among the most important of which are elongation and tensile strength. These properties must be such as to enable the grain of propellant to withstand storage and handling conditions prior to firing and withstand loads to which the propellant is subjected during actual firing and burning. Typical of conditions to which the grain is subjected is that of varying temperatures which cause the propellant and metal case of the rocket motor to expand and contract at different rates. Such expansion and contraction must be permitted to occur without the development of cracks or other imperfections in the mass of propellant which would lead to changes in exposed burning surface and uncontrolled burning. Because of the quick change in pressure exerted on the grain of propellant upon firing, the propellant must also have such properties as to be able to withstand such changes in pressure which tend to change the dimension and shape of the propellant grain.

Emphasis has been placed on the use of flexible fuel-binder material to avoid problems associated with the storing, handling, and firing of solid propellant. While many of these fuel-binders are satisfactory, under certain conditions, others have proven unreliable and unsatisfactory.

Accordingly, an object of this invention is to provide an improved solid propellant. Another object is to provide a novel, castable, solid propellant composition of the composite type having improved physical properties such as elongation and tensile strength, particularly at ambient and high temperatures. Another object is to provide a jet propulsion device, such as a missile, gas generator, etc., the combustion chamber of which is loaded with a novel, castable, solid propellant charge or grain. Another object is to provide a propellant having an improved buring rate which is relatively insensitive to combustion chamber pressure. Another object is to provide a solid propellant having a relatively high specific impulse. Another object is to provide a solid propellant composition which has less tendency to crack or change in dimension and shape during storage, handling, or firing. Other objects and advantages of this invention will become apparent to those skilled in the art from the following discussion, appended claims and drawing in which:

FIGURE 1 is a side elevational view in partial section of a rocket motor loaded with a solid propellant charge of this invention; and FIGURE 2 is a cross sectional view of FIGURE 1 taken along the plane indicated.

A fuller understanding of this invention will be gained by reference to the accompanying drawing in which there is illustrated a rocket motor 10 loaded with the solid propellant composition of this invention, the particular jet propulsion device shown being that employed to assist the take-off of aircraft, which device is known in the art as a JATO unit. The rocket motor 10 comprises a cylindrical casing 11, made of metal or the like, which has a reduced aft portion 12 having an axial opening into which an exhaust nozzle 13 is threaded or otherwise secured. The nozzle 13 is formed with internal restrictions so as to define a converging-diverging passage 14 of the De Laval type through which combustion gases pass. A blowout diaphragm or starter disc 16, which is mounted across the passage 14, is designed so as to be ejected through the nozzle passage when the pressure in the rocket motor reaches the predetermined value, e.g., between 200 and 500 p.s.i. The reduced casing portion 12 can also be provided with one or more conventional safety plug attachments which are adapted to rupture or otherwise function at a predetermined combustion chamber pressure so as to relieve excessive pressures which might otherwise rupture the rocket motor or cause an explosion. The cylindrical casing 11 defies a combustion chamber 17 in which is disposed a charge 18 of the novel solid propellant of this invention. The specific propellant charge or grain 18 illustrated is cylindrical in shape and is bonded to the inner wall of the casing 11 by means of suitable restricting material or adhesive 19. The propellant charge 18 is of the internal burning type by reason of its restricted outer cylindrical surface and its exposed inner surface 21 which is defined by an axial perforation 22 that extends the length of the propellant charge and preferably has the shape of a star in cross section. The ends of the propellant charge 18 are similarly restricted by a layer of restricting material 19. The head end 15 of the motor is closed and provided with an axial opening in which is threaded or otherwise secured an igniter 23. The latter can comprise a frangible cup or container 24, made of wire mesh, plastic, or the like, containing suitable ignition material, such as black powder or other pyrotechnic, which is ignited by suitable electro-responsive means, such as squibs, matches, or the like, that are operatively connected to suitable binding posts within the removable cup 26, the binding posts being adapted to be operatively connected suitable igniter which can be employed is that disclosed in copending application, Serial No. 591,340, filed June 14, 1958, now U.S. Patent No. 2,980,021, by B. R. Adelman.

It is to be understood that the rocket motor illustrated in the drawing and discussed hereinabove is that of a preferred type of jet propulsion device which can be loaded with a solid propellant charge fabricated in accordance with this invention. While the rocket motor illustrated is shown loaded with a single grain of solid propellant, it is to be understood that it can be loaded with a plurality of grains of solid propellant assembled in any desired fashion. The propellant composition of this invention can be formed into a grain having any desired shape or geometry, such as grains of the internal, external, and internal-external burning types, and geometries which provide progressive, neutral, or degressive modes of burning.

In the operation of the rocket motor shown in the drawing, the motor is armed by removing the cover 26 from igniter assembly 23 and connecting the binding posts thereof to an electrical circuit of a source of power. Upon closing a suitable switch, electric current fires the squibs, matches, or the like, embedded in the ignition material within the frangible cup 24, causing ignition of the ignition material. The firing of the igniter device 23 results in the formation of hot ignition products which are released from the frangible cup 24 and immediately propagate throughout the combustion chamber 17, these products being preferably directed down the axial perforation 22. The heat from the ignition products is transferred to the exposed burning surface 21 of the propellant charge 18, raising said surface to an ignition temperature. The resulting ignition of the propellant charge 18 and its subsequent burning or consumption results in generating hot combustion gases which raise the pressure and temperature within the combustion chamber. When a predetermined blowout disc bursting pressure is reached, for example, 200–500 p.s.i., the blowout disc 16 functions, for example, by rupturing, and it is expelled from the rocket motor via the passage 14. The combustion gases are then free to flow at a high velocity from the combustion chamber 17 through the now opened constricted nozzle 13, thereby imparting thrust to the rocket motor.

The propellant compositions of this invention are of the composite type and can be cast or molded in the form of grains. These propellant compostiions comprise a major amount of a solid inorganic oxidizing salt, which functions as the oxidizer, and a minor amount of a novel polyurethane, which functions as the fuel-binder. The polyurethane fuel-binder is formed by the reaction of a polyisocyanate and a polyol copolymer of 2 or more mixed cyclic ethers which copolymers are mixed with a minor amount of an organic polyhydroxy compound which functions as a crosslinking agent and which also reacts with the polyisocyanate.

The cyclic ethers (epoxy compounds) useful in preparing the polyurethane fuel-binders of this invention can be defined by the following structural formula:

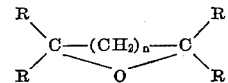

wheren $n$ is an integer from 0 to 3, and R is a radical selected from the group consisting of hydrogen, alkyl, alkenyl, alkynyl, aromatic, alkaryl, aralkyl, cycloalkyl, alkylcycloalkyl, and halogen substituted groups thereof, the total number of carbon atoms in said compound not exceeding 36.

Representative copolymerizable cyclic ethers (named according to the epoxy nomenclature) include: epoxyethane (ethylene oxide); 1-phenylepoxyethane; 1-cyclohexyl-2-(4-chlorocyclohexyl)-epoxyethane; 1,2-diphenylepoxyethane; 1,2-diphenyl-1-chloroepoxyethane; 1-cyclohexyl-2,3-epoxypropane; 1,2-epoxypropane; 1,3-epoxypropane; 1,2-epoxy-2-methylpropane; 3-chloro-1,2-epoxypropane; 3-bromo-1,2-epoxypropane; 2-methyl-1,2-epoxypropane; 3-phenyl-1,2-epoxypropane; cyclohexyl-1,3-epoxypropane; bromo-1,3-epoxypropane; 1-phenyl-3-(3-methylphenyl)-1,2-epoxypropane; 1-(3-chlorocyclohexyl)-3-cyclopentyl-1,2-epoxypropane; 1,2-epoxybutane; 2,3-epoxybutane; 1,3-epoxybutane; 1,4-epoxybutane; 3,4-dichloro-1,2-epoxybutane; 3-methyl-1,2-epoxybutane; 2,3-dimethyl-2,3-epoxybutane; 3-(3-methylphenyl)-1,2-epoxybutane; 1-phenyl-4-(3-chlorophenyl)-1,2-epoxybutane; 1-(3-ethylcyclohexyl)-4-cyclopentyl-1,2-epoxybutane; 1,2-epoxypentane; 1,3-epoxypentane; 1-epoxypentane; 2,3-epoxyhexane; 1,2-epoxyheptane; 3,4-epoxydecane; 1,2-epoxydodecane; 5,6-epoxytricane; 1,2-epoxypentadecane; 1,3-epoxyoctadecane; 1,3-epoxyeicosane; 1,2-epoxypentacosane; 1,3-epoxytriacontane; 1,2-epoxydotriacontane; 1,3-epoxyhexatriacontane; 1,2-epoxy-3-butene; 1,2-epoxy-3,5-hexadiene; 5-methyl-6-phenyl-3,4-epoxy-1,5-hexadiene; 1,2-epoxy-3-butyne; 2,3-epoxy-4-pentyne; 3,4-epoxy-1-heptene-6-yne, and the like.

The epoxy compounds preferred in preparing the polyol polymers are the vic-epoxy compounds containing 2 to 4 carbon atoms, such as epoxyethane, 1,2-epoxypropane, and 1,2-epoxy-3-methylpropane.

The polymerization of 2 or more of these mixed cyclic ethers to form the polyol polymers having high molecular weights (e.g., 500 to 10,000) is known in the art and for purposes of brevity their polymerization will not be set forth in detail herein. The preferred polyol polymers used in preparing the polyurethane fuel-binders of this invention are polydiol mixed polymers of epoxyethane (ethylene oxide) and 1,2-epoxypropane (1,2-propylene oxide), sometimes referred to as mixed polyoxypropylene - polyoxyethylene polymers. Commercially available polyol polymers of this type include: Pluronics designated L44, L61, L62, L64, and F68, which have the general formula $HO(C_2H_4O)_a(C_3H_6O)_b(C_2H_4O)_cH$; and N1AX polyols designated Diol 50–HEG, Diol 25–HEG, and Diol 10–HEG. These Puronic polyol polymers are block polymers whereas the N1AX polymers are random polymers.

The polyhydroxy compounds which function as crosslinking agents and also react with the polyisocyanates, have three or more hydroxy groups. Representative polyhydroxy crosslinking compounds include: saturated aliphatic and aromatic polyhydric alcohols, such as 1,2,3-propanetriol (glycerol), 1,2,6-hexanetriol, trimethylolpropane, erythritol, pentaerythritol, rabitol, xylitol, sorbitol, mannitol, trimethylolphenol, trimethylolbenzene, and the like; polyhydric amines, such as trimethylolamine, triethanolamine, triisopropanolamine, tri - n - propanolamine, N,N,N',N'-tetrakis(2-hydroxypropyl) ethylene diamine (Quadrol), N(2-hydroxyethyl)-N,N',N'-tris(2-hydroxypropyl) ethylene diamine, and the like; esters of polyhydric alcohols and fatty acids, such as castor oil, glyceryl mono-, di-, and triricinoleate, glyceryl mono-, di-, and tri(12-hydroxystearate), pentaerythritol mono-, di-, tri-, and tetraricinoleate, pentaerythritol mono-, di-, tri-, and tetra(12-hydroxystearate), 2,3-dihydroxypropyl-12-hydroxystearate, 2,3-dihydroxy ricinoleate, and the like; alkylene oxide adducts of polyhydric alcohols, such as ethylene oxide adducts of glycerol, 1,2,6-hexanetriol, and pentaerylthritol, propylene oxide adducts of glycerol (N1AX Triol LG Series), propylene oxide adducts of 1,2,6-hexanetriol, (N1AX Triol LHT Series), and the like; condensation products of 2 or more polyhydric alcohols, such as condensation products of 1,2,6-hexanetriol and glycerol; and the like; polyhydric derivatives of sugars, such as the octakis(2-hydroxypropyl) derivative of sucrose (Hyprose SP80), and like derivatives of glycose; and the like.

The amount of polyhydroxy compound used in preparing the propellant compositions of this invention will be minor, generally between 0.01 to 15 weight percent of the total propellant, preferably 0.25 to 5 weight percent.

The polyol polymers and polyhydroxy crosslinking compounds are reacted with organic polyisocyanates to form polyurethanes. The polyisocyanate is used in at least a stoichiometric amount (based on the active hydrogen functionality of the polyol polymer and polyhydroxy compound), and preferably up to 25 percent in excess of stoichiometric. Representative polyisocyanates which can be used include: benzene-1,3-diisocyanate; benzene-1,4-diisocyanate; hexamethylene diisocyanate; toluene-2,4-diisocyanate; toluene-2,5-diisocyanate; diphenylmethane-4,4' - diisocyanate; diphenyl - 4,4' - diisocyanate; diphenyl-3,3'-dimethyl-4,4'-diisocyanate; 2-chloropropane-1,3 - diisocyanate; diphenyl - 3,3'-dimethoxy-4,4'-diisocyanate; naphthalene-1,5-diisocyanate; pentamethylene diisocyanate; tetramethylenediisocyanate; octamethylene diisocyanate; dimethylene diisocyanate; propylene-1,2-diisocyanate; benzene-1,2,4-triisocyanate; toluene-2,3-diisocyanate; diphenyl-2,2'-diisocyanate; naphthalene-2,7-diisocyanate; napthalene-1,8-diisocyanate; toluene-2,4,6-triisocyanate; benzene-1,3,5-triisocyanate; benzene-1,2,3-triisocyanate; toluene-2,3,4-triisocyanate; and the like. The diisocyanates are preferred, particularly the toluene diisocyanates, because of their availability and ease of preparation.

The inorganic oxidizing salts which are employed as oxidizers in the solid propellant compositions of this invention representatively include the ammonium, alkali metal, and alkaline earth metal salts of nitric, perchloric, and chloric acids. Mixtures of these oxidizing salts can also be used. Ammonium nitrate and ammonium perchlorate are the preferred oxidizers for use in the solid propellant compositions of this invention. Other applicable oxidizers representatively include sodium nitrate, potassium perchlorate, lithium chlorate, calcium nitrate, barium perchlorate, strontium chlorate, and the like. In the preparation of the propellant compositions, the oxidizers are powdered to sizes generally in the range of from 1 to 300 microns average particle size, preferably in the range between 20 and 200 microns.

The amount of solid oxidizer employed will usually be a major proportion of the total composition, and is generally in the range between 65 and 95 percent by weight of the total mixture. The fuel-binder in the propellant composition will usually be a minor proportion of the total composition, and is generally in the range between 5 and 35 percent by weight of the total mixture.

The propellant compositions of this invention can also contain various other conventional compounding ingredients, such as plasticizers, antioxidants, wetting agents, curing agents, metal oxides, reinforcing agents, powdered metals, and the like. The finished fuel-binder usually contains these other compounding ingredients, and the term will be used generically herein to cover the mixture of the polyurethane with these other ingredients, unless otherwise noted.

Suitable plasticizers useful in preparing these propellant compositions representatively include any of those which are compatible with the polyurethanes, such as TP–90–B (di(3,6-dioxadecyl) formal); isodecylpelargonate; Pentaryl A (monoamylbiphenyl); tricresyl and trioctyl phosphates; and the like. These plasticizers are preferably used in quantities of less than 50 parts preferably 5 to 10 parts, per 100 parts polyurethane.

A suitable representative antioxidant is Flexamine, a physical mixture containing 25 percent of a complex diarylamine-ketone reaction product and 35 percent of N,N' - diphenyl - p-phenylenediamine. A suitable representative wetting agent is Aerosol-OT (dioctyl sodium sulfosuccinate). Suitable metal oxides representatively include zinc oxide, magnesium oxide, iron oxide, chromium oxide, or combination of these metal oxides, and the like. Reinforcing agents representatively include carbon black, wood flour, lignin, various reinforcing resins such as styrene-divinylbenzene, methyl acrylate-divinylbenzene, acrylic acid-styrene-divinylbenzene, methyl acrylate-acrylic acid-divinylbenzene resins and the like. Casting aids such as Kel-F Polymer Oil (polytrifluorochloroethylene) can also be incorporated in the polymer compositions if desired.

Burning rate catalysts which can be used in this invention representatively include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other conventional catalysts which can be used are ammonium dichromate and copper chromite.

Useful powdered metals which can be incorporated into the propellant compositions of this invention representatively include those metals with molecular weights up to 30, such as aluminum, boron, magnesium, beryllium, and the like. Alloys are also applicable, such as the aluminum alloys of boron, magnesium, manganese, zinc, copper, and the like. These metals and alloys can be powdered to a size in the range of 1 to 200 microns, and used in minor amounts, e.g., between 2 and 25 weight percent of the propellant composition.

In preparing the propellant compositions of this invention, all of the binder ingredients, except the polyisocyanate are first blended together. For example, the polyol polymer, polyhydroxy compound, and if desired, the plasticizer, are blended, and the resulting blend then further admixed with the polyisocyanate. The oxidizer, and other dry ingredients, such as powdered metal, is added in portions or increments to the binder, and the whole blended together, preferably under vacuum. Alternatively, all the binder ingredients except the polyisocyanate can be blended with the oxidizer, and the resulting blend evacuated and heated for a short time, e.g., 10 minutes, and the polyisocyanate then added, after which the composition is further mixed under vacuum and heated. The propellant compounded can be carried out in any conventional equipment used in the propellant art, such as a Readco Sigma-blade mixer or the like. After blending the propellant constituents, the mixture can be evacuated and heated to effect curing of the propellant. During the curing step, the polyisocyanate reacts with the polyol polymer to form a polyurethane, the polyisocyanate also reacting with the polyhydroxy compound to effect crosslinking between polyol polymer chains. The cured propellant composition comprises a matrix of polyurethane fuel-binder in which the oxidizer is dispersed, as is typical of composite propellants.

Since the propellant compositions of this invention are castable, propellant grains can be formed by pouring the propellant composition in a separate mold and loading the same as a cartridge into the rocket motor. Either the propellant-loaded cartridge or cartridge loaded motor can be cured. Alternatively, the restricting liner can be first cast into the rocket motor case, cured, and the propellant material then cast in around a core or mandrel which is later removed from the rocket motor. After loading the rocket motor with the propellant composition, the whole can then be cured according to known techniques so as to form a rigid mass. Suitable curing temperatures generally are in the range between 130 and 250° F., preferably between 150 and 200° F.

The following examples are set forth for illustrative purposes and it should be understood that the specific ingredients, amounts, conditions of preparation, and the like, set forth therein merely represent preferred and illustrative embodiments of this invention and should not unduly limit the same.

EXAMPLE I

A plurality of propellant compositions of this invention were prepared and cured. "Dogbone" specimens of each of the cured propellant compositions were prepared and their physical properties determined according to the standard JANAF tests described in SPIA/PP8, February 1957. The compositions and physical properties of these specimens are set forth in Table I, an examination of which shows the improved physical properties of these propellant compositions, particularly tensile strength and elongation at ambient and high temperatures.

*Table I*

| | Propellant | | Physical properties [1] | | | | | |
|---|---|---|---|---|---|---|---|---|
| No. | Ingredients | Weight percent | T | Sm | Sb | $\epsilon$m | $\epsilon$b | E |
| 1 | N1AX diol 25–HEG–28 [2] | 15.88 | 74 | 48 | 20 | 35.3 | 171.5 | 313 |
|   | Castor oil | 2.70 | 170 | 33 | 30 | 48.7 | 55.2 | 154 |
|   | Toluene diisocyanate | 1.42 | –40 | 1,003 | | 0.9 | | 105,666 |
|   | Ammonium perchlorate | 80.00 | | | | | | |
| 2 | N1AX diol 25–HEG–28 | 17.52 | 75 | 81 | 34 | 60 | 205 | 497 |
|   | Quadrol [3] | 0.64 | 170 | 72 | 66 | 114 | 126 | 166 |
|   | Toluene diisocyanate | 1.84 | –40 | 770 | | 1 | | 74,950 |
|   | Ammonium perchlorate | 68.00 | | | | | | |
|   | Powdered aluminum (13μ) | 12.00 | | | | | | |
| 3 | N1AX diol 25–HEG–28 | 17.52 | 70 | 164 | 80 | 52.3 | 253 | 1,510 |
|   | Quadrol | 0.64 | 170 | 135 | 121 | 111 | 124 | 265 |
|   | Toluene diisocyanate | 1.84 | –40 | 856 | | 0.9 | | 99,075 |
|   | Ammonium perchlorate | 80.00 | | | | | | |
| 4 | N1AX diol 25–HEG–37 [2] | 16.88 | 70 | 90 | 48 | 86 | 312 | 857 |
|   | Quadrol | 0.86 | 170 | 43 | 42 | 224 | 242 | 41 |
|   | Toluene diisocyanate | 2.26 | –40 | 1,320 | | 1.1 | | 80,500 |
|   | Ammonium perchlorate | 80.00 | | | | | | |
| 5 | N1AX diol 50–HEG–28 [2] | 16.52 | 70 | 303 | 204 | 29.9 | 79 | 7,430 |
|   | Quadrol | 0.90 | 170 | 80 | 66 | 48.9 | 60.8 | 302 |
|   | Toluene diisocyanate | 2.58 | –40 | 885 | | 0.8 | | 114,140 |
|   | Ammonium perchlorate | 80.00 | | | | | | |
| 6 | N1AX diol 50–HEG–42 [2] | 14.87 | 80 | 125 | 87 | 23 | 50 | 1,350 |
|   | Quadrol | 0.81 | 170 | 137 | 124 | 17 | 20 | 495 |
|   | Toluene diisocyanate | 2.32 | –40 | 884 | | 1 | | 89,500 |
|   | Isodecyl pelargonate | 2.00 | | | | | | |
|   | Ammonium perchlorate | 80.00 | | | | | | |
| 7 | Pluronic L61 [4] | 16.22 | 75 | 289 | 239 | 27.3 | 38.3 | 2,055 |
|   | Quadrol | 0.94 | 170 | 143 | 133 | 25.8 | 27.5 | 733 |
|   | Toluene diisocyanate | 2.84 | –40 | 1,223 | | 0.9 | | 152,550 |
|   | Ammonium perchlorate | 80.00 | | | | | | |
| 8 | Pluronic L61 [4] | 21.2 | 75 | 273 | 201 | 55.2 | 87.9 | 1,292 |
|   | Quadrol | 1.2 | 170 | 158 | 142 | 50.4 | 54.2 | 419 |
|   | Toluene diisocyanate | 3.7 | –40 | 1,257 | | 0.8 | | 162,980 |
|   | Ammonium perchlorate | 73.9 | | | | | | |

[1] T=° F. of tests. S=maximum stress, p.s.i. $S_b^m$=ultimate stress, p.s.i. $\epsilon$m=elongation at maximum stress, percent. $\epsilon$b=ultimate elongation, percent. E=Young's modulus, p.s.i.
[2] Mixed polyoxypropylene-polyoxyethylene polymers prepared from ethylene glycol as starting molecule and having mol. weights in range of 980 to 4,000.
[3] A polydiol compound cross linking agent, tetrakis (β-hydroxypropyl) ethylne diamine.
[4] A liquid mixed polyoxypropylene-polyoxyethylene polymer having a mol. weight of 1,501–1,800 and having 10% polyoxyethylene in total molecule.

EXAMPLE II

Another plurality of propellant compositions were prepared and cured. These propellant compositions were cast into sleeves measuring 5 inches in length and 3 inches in diameter, using a 1½ inch diameter axial mandrel. The cured, cast sleeves were inserted in a rocket motor and burned to determine ballistic properties. Strand specimens of some of these propellant compositions were burned according to the Crawford bomb technique and burning rates determined.

The compositions and ballistic properties of these propellants are set forth in Table II. Examination of the data in Table II shows that the propellant compositions have fast burning rates which are relatively insensitive to combustion chamber pressure, and that these propellant compositions have relatively high specific impulses.

Table II

| No. | Ingredients | Weight percent | Strand data r | Strand data n | Motor data r | Motor data n | Motor data $I_{sp}$ | Motor data c* |
|---|---|---|---|---|---|---|---|---|
| 1 | Pluronic L61 [2] | 14.36 | 0.190 (at 600 p.s.i.) | 0.38 (at 300–1,250 p.s.i.). | | | | |
|   | Castor oil | 3.26 | 0.230 (at 1,000 p.s.i.) | | | | | |
|   | Toluene diisocyanate | 2.38 | | | | | | |
|   | Ammonium perchlorate | 80.00 | | | | | | |
| 2 | Pluronic L61 [2] | 13.64 | | | 0.354 (at 1310 p.s.i.). | | 215 (at 1,000 p.s.i.). | 4,678 (at 1,000 p.s.i.). |
|   | Castor oil | 3.10 | | | | | | |
|   | Toluene diisocyanate | 2.26 | | | | | | |
|   | Kel-F polymer oil [3] | 1.00 | | | | | | |
|   | Ammonium perchlorate | 80.00 | | | | | | |
| 3 | Pluronic L61 | 14.36 | | | 0.230 (at 840 p.s.i.). | | 202 (at 1,000 p.s.i.). | 4,790 (at 1,000 p.s.i.). |
|   | Castor oil | 3.26 | | | | | | |
|   | Toluene diisocyanate | 2.38 | | | | | | |
|   | Powdered aluminum (1.8 µ flake). | 5.00 | | | | | | |
|   | Ammonium perchlorate | 75.00 | | | | | | |
| 4 | Pluronic L61 | 14.36 | 0.246 (at 600 p.s.i. and at 1,000 p.s.i.). | 0.00 (at 300–1,000 p.s.i.) | 0.264 (at 1,000 p.s.i.). | | 230 [4] at 1,000 p.s.i.). | 4,348 (at 1,000 p.s.i.). |
|   | Castor oil | 3.26 | | | | | | |
|   | Toluene diisocyanate | 2.38 | | | | | | |
|   | Powdered aluminum (6 µ flake). | 5.00 | | | | | | |
|   | Ammonium perchlorate | 75.00 | | | | | | |
| 5 | Pluronic L61 | 15.08 | | | 0.278 (at 298–612 p.s.i.). | 0.00 (at 298–612 p.s.i.). | | 4,150 (at 298 p.s.i.). 4,475 (at 612 p.s.i.). |
|   | Castor oil | 3.42 | | | | | | |
|   | Toluene diisocyanate | 2.50 | | | | | | |
|   | Powdered aluminum (6µ flake) | 5.30 | | | | | | |
|   | Ammonium perchlorate | 73.70 | | | | | | |
| 6 | Pluronic L61 | 15.08 | | | 0.228 (at 854 p.s.i.). | | 230 (at 1,000 p.s.i.). | 4,740 (at 1,000 p.s.i.). |
|   | Castor oil | 3.42 | | | | | | |
|   | Toluene diisocyanate | 2.50 | | | | | | |
|   | Powdered aluminum (6µ flake) | 5.30 | | | | | | |
|   | Ammonium perchlorate | 73.70 | | | | | | |
| 7 | Pluronic L61 | 14.36 | | | 0.228 (at 825 p.s.i.). | | 207 (at 1,000 p.s.i.). | 4,887 (at 825 p.s.i.). |
|   | Castor oil | 3.26 | | | | | | |
|   | Toluene diisocyanate | 2.38 | | | | | | |
|   | Kel-F polymer oil | 1.00 | | | | | | |
|   | Powdered aluminum (6µ flake) | 5.30 | | | | | | |
|   | Ammonium perchlorate | 73.70 | | | | | | |
| 8 | Pluronic L61 | 14.36 | | | 0.232 (at 830 p.s.i.). | | 211 (at 1,000 p.s.i.). | 4,810 (at 830 p.s.i.). |
|   | Castor oil | 3.26 | | | | | | |
|   | Toluene diisocyanate | 2.38 | | | | | | |
|   | Kel-F polymer oil | 1.00 | | | | | | |
|   | Powdered aluminum (6µ flake). | 5.30 | | | | | | |
|   | Ammonium perchlorate | 73.70 | | | | | | |
| 9 | Pluronic L61 | 14.36 | | | 0.263 (at 1,000 p.s.i.). | | 228 (at 980 p.s.i.). | 4,790 (at 1,000 p.s.i.). |
|   | Castor oil | 3.26 | | | | | | |
|   | Toluene diisocyanate | 2.38 | | | | | | |
|   | Kel-F polymer oil | 1.00 | | | | | | |
|   | Powdered aluminum (6µ flake) | 5.30 | | | | | | |
|   | Ammonium perchlorate | 73.70 | | | | | | |
| 10 | Pluronic L61 | 11.82 | | | 0.346 (at 1,210 p.s.i.). | | 224 (at 1,000 p.s.i.). | 5,010 (at 1,210 p.s.i.). |
|   | Castor oil | 2.72 | | | | | | |
|   | Toluene diisocyanate | 1.96 | | | | | | |
|   | Kel-F polymer oil | 1.00 | | | | | | |
|   | Boron | 5.00 | | | | | | |
|   | Ammonium perchlorate | 77.50 | | | | | | |
| 11 | Pluronic L61 | 13.64 | | | 0.273 (at 722 p.s.i.). | | 216 (at 1,000 p.s.i.). | 4,622 (at 722 p.s.i.). |
|   | Castor oil | 3.10 | | | | | | |
|   | Toluene diisocyanate | 2.26 | | | | | | |
|   | Kel-F polymer oil | 1.00 | | | | | | |
|   | Boron | 5.00 | | | | | | |
|   | Ammonium perchlorate | 75.00 | | | | | | |
| 12 | Pluronic L61 | 14.36 | | | 0.266 (at 1,000 p.s.i.). | | 216 (at 1,000 p.s.i.). | 4,970 (at 1,000 p.s.i.). |
|   | Castor oil | 3.26 | | | | | | |
|   | Toluene diisocyanate | 2.38 | | | | | | |
|   | Kel-F polymer oil | 1.00 | | | | | | |
|   | Boron | 5.30 | | | | | | |
|   | Ammonium perchlorate | 73.70 | | | | | | |

[1] r=burning rate, in./sec. n=pressure exponent. $I_{sp}$=specific impulse, lb-sec./lb. c*=characteristic exhaust velocity, ft./sec.
[2] a liquid mixed polyoxypropylene-polyoxyethylene polymer having a Mol Wt. of 1501–1800 and having 10 percent polyoxyethylene in total molecule.
[3] a casting aid, polytrifluorochloroethylene.
[4] $I_{sp}$ was 243 when corrected for heat loss.

Various modifications and alterations of this invention will become apparent to those skilled in the art from the foregoing discussion and accompanying drawing, and it should be understood that the subject invention is not to be unduly limited thereto.

I claim:

1. A castable solid propellant of the composite type, consisting essentially of 65 to 95 weight percent of a solid inorganic oxidizer and 5 to 35 weight percent of a polyurethane fuel-binder formed by the reaction of a polyisocyanate with a polyol copolymer of mixed cyclic ethers and a polyhydroxy crosslinking compound, said polyisocyanate being selected from the group consisting of benzene-1,3-diisocyanate, benezene-1,4-diisocyanate, hexamethylene diisocyanate, toluene-2,4-diisocyanate, toluene-2,5-diisocyanate, diphenylmethane-4,4'-diisocyanate, diphenyl-4,4'-diisocyanate, diphenyl-3,3'-dimethyl-4-4'-diisocyanate, 2-chloropropane-1,3-diisocyanate, diphenyl-3,3'-dimethoxy-4,4'-diisocyanate, naphthalene-1,5-diisocyanate, pentamethylene diisocyanate, tetramethylenediisocyanate, octamethylene diisocyanate, dimethylene diisocyanate, propylene-1,2-diisocyanate, benzene-1,2,4-triisocyanate, toluene-2,3-diisocyanate, diphenyl-2,2'-diisocyanate, naphthalene-2,7-diisocyanate, naphthalene-1,8-diisocyanate, toluene-2,4,6-triisocyanate, benzene-1,3,5-triisocyanate, benzene-1,2,3-triisocyanate, and toluene-2,3,4-triisocyanate, said cyclic ether being selected from the group consisting of epoxyethane, 1-phenyl-epoxyethane, 1-cyclohexyl-2-(4-chlorocyclohexyl)-epoxyethane, 1,2-diphenyl-epoxyethane, 1,2-diphenyl-1-chloroepoxyethane, 1-cyclohexyl-2,3-epoxypropane, 1,2-epoxypropane, 1,3-epoxypropane, 1,2-epoxy-2-methylpropane, 3-chloro-1,2-epoxypropane, 3-bromo-1,2-epoxypropane, 2-methyl-1,2-epoxypropane, 3-phenyl-1,2-epoxypropane, 3-cyclohexyl-1,3-epoxypropane, 3-bromo-1,3-epoxypropane, 1-phenyl-3-(3-methylphenyl)-1,2-epoxypropane, 1-(3-chlorocyclohexyl)-3-cyclopentyl-1,2-epoxypropane, 1,2-epoxybutane, 2,3-epoxybutane, 1,3-epoxybutane, 1,4-epoxybutane, 3,4-dichloro-1,2-epoxybutane, 3-methyl-1,2-epoxybutane, 2,3-dimethyl-2,3-epoxybutane, 3-(3-methylphenyl)-1,2-epoxybutane, 1-phenyl-4-(3-chlorophenyl)-1,2-epoxybutane, 1-(3-ethylcyclohexyl)-4-cyclopentyl-1,2-epoxybutane, 1,2-epoxypentane, 1,3-epoxypentane, 1,4-epoxypentane, 2,3-epoxyhexane, 1,2-epoxyheptane, 3,4-epoxydecane, 1,2-epoxydodecane, 5,6-epoxytricane, 1,2-epoxypentadecane, 1,3-epoxyoctadecane, 1,3-epoxyeicosane, 1,2-epoxypentacosane, 1,3-epoxytriacontane, 1,2-epoxydotriacontane, 1,3-epoxy-hexatriacontane, 1,2-epoxy-3-butene, 1,2-epoxy-3,5-hexadiene, 5-methyl-6-phenyl-3,4-epoxy-1,5-hexadiene, 1,2-epoxy-3-butyne, 2,3-epoxy-4-pentyne, and 3,4-epoxy-1-heptene-6-yne, and said polyhydroxy crosslinking agent being selected from the group consisting of 1,2,3-propanetriol, 1,2,6-hexanetriol, trimethylolpropane, erythritol, pentaerythritol, ribitol, xylitol, sorbitol, mannitol, trimethylolphenol, trimethylolbenzene, trimethylolamine, triethanolamine, triisopropanolamine, tri-n-propanolamine, N,N,N',N'-tetrakis(2-hydroxypropyl) ethylene diamine, N(2-hydroxyethyl)-N,N',N'-tris(2-hydroxypropyl) ethylene diamine, castor oil, glyceryl mono-, di-, and triricinoleate, glyceryl mono-, di-, and tri(12-hydroxystearate), pentaerythritol mono-, di-, tri-, and tetraricinoleate, pentaerythritol mono-, di-, tri-, and tetra(12-hydroxystearate), 2,3-dihydroxypropyl-12-hydroxystearate, 2,3-dihydroxy ricinoleate, ethylene oxide adducts of glycerol, 1,2,6-hexanetriol, and pentaerythritol, propylene oxide adducts of glycerol, propylene oxide adducts of 1,2,6-hexanetriol, condensation products of 1,2,6-hexanetriol and glycerol and the octakis(2-hydroxypropyl) derivative of sucrose.

2. The propellant composition according to claim 1 wherein said polyhydroxy crosslinking compound is N,N,N',N'-tetrakis(2-hydroxypropyl)ethylene diamine.

3. The propellant composition according to claim 1 wherein said polyhydroxy crosslinking compound is castor oil.

4. The propellant composition according to claim 1 wherein said polyol copolymer is a polyoxypropylene-polyoxyethylene copolymer.

5. The propellant composition according to claim 1 wherein said inorganic oxidizer is a salt selected from the group consisting of the ammonium, alkali metal, and alkaline earth metal salts of nitric perchloric, and chloric acids.

6. The propellant composition according to claim 1 wherein said inorganic oxidizer is ammonium perchlorate.

7. A castable solid propellant composition of the composite type, consisting essentially of 65 to 95 weight percent of ammonium perchlorate and 5 to 35 weight percent of a polyurethane fuel-binder formed by the reaction of toluene diisocyanate with a polyoxypropylene-polyoxyethylene copolymer and castor oil.

8. A castable solid propellant composition of the composite type, consisting essentially of 65 to 95 weight percent of ammonium perchlorate and 5 to 35 weight percent of a polyurethane fuel-binder formed by the reaction of toluene diisocyanate with a polyoxypropylene-polyoxyethylene and N,N,N',N'-tetrakis($\beta$-hydroxypropyl) ethylene diamine.

References Cited in the file of this patent
UNITED STATES PATENTS

| | | |
|---|---|---|
| 2,447,200 | Miller | Aug. 17, 1948 |
| 2,488,154 | Africano | Nov. 15, 1949 |
| 2,783,138 | Parsons | Feb. 26, 1957 |
| 2,857,258 | Thomas | Oct. 21, 1958 |
| 2,928,866 | Vanneman et al. | Mar. 15, 1960 |

OTHER REFERENCES

Zaehringer: Modern Plastics, vol. 34, October 1956, page 149.

Dombrow: "Polyurethanes," Reinhold Publishing Co., New York (1957), pages 4,5, 104, 118–121, 158–160.

Missiles and Rockets, vol. 2, No. 8, August 1957, pages 67–73, at page 71.

Noland: Chemical Engineering, May 19, 1958, pages 154, 155.

Zaehringer: Solid Propellant Rockets, Second Stage, American Rocket Co., Box 1112, Wyandotte, Mich., September 1958, pages 207–219.